United States Patent
Furman et al.

(10) Patent No.: US 11,256,490 B1
(45) Date of Patent: Feb. 22, 2022

(54) SYSTEMS AND METHODS FOR SERVER OPERATING SYSTEM PROVISIONING USING SERVER BLUEPRINTS

(71) Applicant: JPMorgan Chase Bank, N.A., New York, NY (US)

(72) Inventors: Aleksandr Boris Furman, Cliffside Park, NJ (US); Hafeez Mohammed, South River, NJ (US); Anthony G Zegarrundo, Katy, TX (US); Pavel Lobashov, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/709,727

(22) Filed: Sep. 20, 2017

Related U.S. Application Data (60) Provisional application No. 62/414,836, filed on Oct. 31, 2016.

(51) Int. Cl.
    *G06F 9/445* (2018.01)
    *G06F 8/61* (2018.01)
    *H04L 67/10* (2022.01)

(52) U.S. Cl.
    CPC .............. *G06F 8/61* (2013.01); *H04L 67/10* (2013.01)

(58) Field of Classification Search
    CPC ........................................... G06F 8/61
    USPC ....................................... 717/177
    See application file for complete search history.

(56) References Cited

U.S. PATENT DOCUMENTS

| | | | | |
|---|---|---|---|---|
| 8,010,777 | B2* | 8/2011 | Nandan | G06F 8/61 709/220 |
| 9,645,805 | B2* | 5/2017 | Govindaraju | G06F 8/60 |
| 9,652,211 | B2* | 5/2017 | Rachamadugu | G06F 8/63 |
| 9,678,731 | B2* | 6/2017 | Hassine | H04L 67/00 |
| 9,749,191 | B2* | 8/2017 | Varney | H04L 41/509 |
| 9,864,625 | B2* | 1/2018 | Chawla | G06F 16/182 |
| 9,998,323 | B2* | 6/2018 | Chhatwal | H04L 41/0843 |
| 10,212,053 | B2* | 2/2019 | Vasudevan | H04L 41/5054 |
| 10,430,204 | B2* | 10/2019 | Reeves | G06F 8/65 |
| 10,445,121 | B2* | 10/2019 | McLeod | G06F 9/45558 |
| 2008/0040455 | A1* | 2/2008 | MacLeod | G06F 8/61 709/220 |
| 2013/0232480 | A1* | 9/2013 | Winterfeldt | G06F 8/60 717/177 |
| 2013/0262845 | A1* | 10/2013 | Pearson | G06F 8/71 713/1 |
| 2014/0280961 | A1* | 9/2014 | Martinez | H04L 41/5054 709/226 |

(Continued)

*Primary Examiner* — Evral E Bodden
(74) *Attorney, Agent, or Firm* — Greenberg Traurig LLP (57) ABSTRACT

Systems and methods for customization server operating system provisioning using server blueprints are disclosed. In one embodiment, a method for provisioning a server using a server blueprint, in a target server comprising a computer processor, may include: (1) receiving a request to provision the target server, the request to provision comprising an identification of a server blueprint for the target server; (2) requesting, over a computer network, an application manifest for the server blueprint comprising an identification of applications to install on the target server; (3) receiving a plurality of software build and install instructions for the application manifest; and (4) executing the build and install instructions on the target server.

18 Claims, 4 Drawing Sheets

(56) References Cited

U.S. PATENT DOCUMENTS

2017/0270325 A1* 9/2017 He ................... G06K 7/10366
2018/0316547 A1* 11/2018 Kamath Govinda ... G06F 16/22

* cited by examiner

SYSTEMS AND METHODS FOR SERVER OPERATING SYSTEM PROVISIONING USING SERVER BLUEPRINTS

RELATED APPLICATIONS

This application claims the benefit of U.S. Provisional Patent Application Ser. No. 62/414,836, filed Oct. 31, 2016, the disclosure of which is hereby incorporated, by reference, in its entirety.

BACKGROUND OF THE INVENTION

1. Field of the Invention

The present invention generally relates to systems and methods for server operating system provisioning using server blueprints.

2. Description of the Related Art

New server computers that are built by Information Technology ("IT") departments are generally built to perform a certain function or role. Depending on the selected role and a desired operating system ("OS"), a specific set of server components, software, and other criteria (e.g., platform, environment, etc.) are installed during the server build in a specific order, commonly referred to a "scripted installation". Scripted installations are often created for each type of server role and each one of its variants. Creating and maintaining these builds generally requires dedicated IT Administration resources.

SUMMARY OF THE INVENTION

Systems and methods for customization server operating system provisioning using server blueprints are disclosed. In one embodiment, a method for provisioning a server using a server blueprint, in a target server comprising a computer processor, may include: (1) receiving a request to provision the target server, the request to provision comprising an identification of a server blueprint for the target server; (2) requesting, over a computer network, an application manifest for the server blueprint comprising an identification of applications to install on the target server; (3) receiving a plurality of software build and install instructions for the application manifest; and (4) executing the build and install instructions on the target server.

In one embodiment, the step of executing the build and install instructions on the target server may include retrieving, from a network location, applications to install in response to the install instructions.

In one embodiment, the request to provision may also include at least one of a server operating system for the target server and a server role for the target server.

In one embodiment, the request for the application manifest for the server blueprint may be made by a server blueprint agent executed by the target server to a server blueprint web service. The server blueprint web service may retrieve the application manifest from a SQL (Structured Query Language) server.

In one embodiment, the method may further include translating the application manifest into a plurality of build and install instructions. The plurality of build and install instructions may include an operating system deployment task sequence.

In one embodiment, the server blueprint may include a plurality of server blueprint components, each server blueprint component comprising a plurality of applications. The plurality of applications may be arranged in the server blueprint component in an installation order. Each application may include a plurality of packages, and each package is associated with a unique identifier.

According to another embodiment, a system for provisioning a server using a server blueprint may include a target server comprising a computer processor; a server blueprint agent executed by the target server; a server build component executed by the target server; a server blueprint web service in communication with the server blueprint agent via a computer network; and a server blueprint SQL database comprising a plurality of server blueprints. The server blueprint agent may receive a request to provision the target server, the request comprising an identification of a server blueprint, and may request an application manifest for the server blueprint from the server blueprint web service. The blueprint web service may query the server blueprint SQL database for an application manifest for the server blueprint. The server blueprint web service may receive the application manifest, and the server blueprint agent may receive the application manifest and translate the application manifest into a plurality of build and install instructions. The server build component may execute the build and install instructions on the target server.

In one embodiment, the request to provision may also include at least one of a server operating system for the target server and a server role for the target server.

In one embodiment, the server blueprint agent may translate the application manifest into a plurality of build and install instructions. The plurality of build and install instructions may include an operating system deployment task sequence.

In one embodiment, the server blueprint may include a plurality of server blueprint components, each server blueprint component comprising a plurality of applications. The plurality of applications may be arranged in the server blueprint component in an installation order. Each application may include a plurality of packages, and each package is associated with a unique identifier.

In one embodiment, the server build component may retrieve, from a network location, applications to install in response to the install instructions.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to a server blueprint solution. In one embodiment, the system and method may define potential patterns of server software based on server roles and other parameters, and provides a way of dynamically compiling a manifest (e.g., a list) of the actual software packages to install during the build based on the requested pattern and other parameters requested. Thus, the number of server builds is reduced because the logic for installing software may be dynamically managed externally via server blueprints.

Embodiments may work with and extend the functionality of the Operating System Deployment (OSD) of Microsoft System Center Configuration Manager (SCCM) product by injecting Dynamic Variables during an live OSD Server Deployment.

One advantage of embodiments disclosed herein is that IT (Information Technology) administrative resource requirements may be reduced, and the end user may benefit from a flexibility of a self-service solution.

Figure 1:
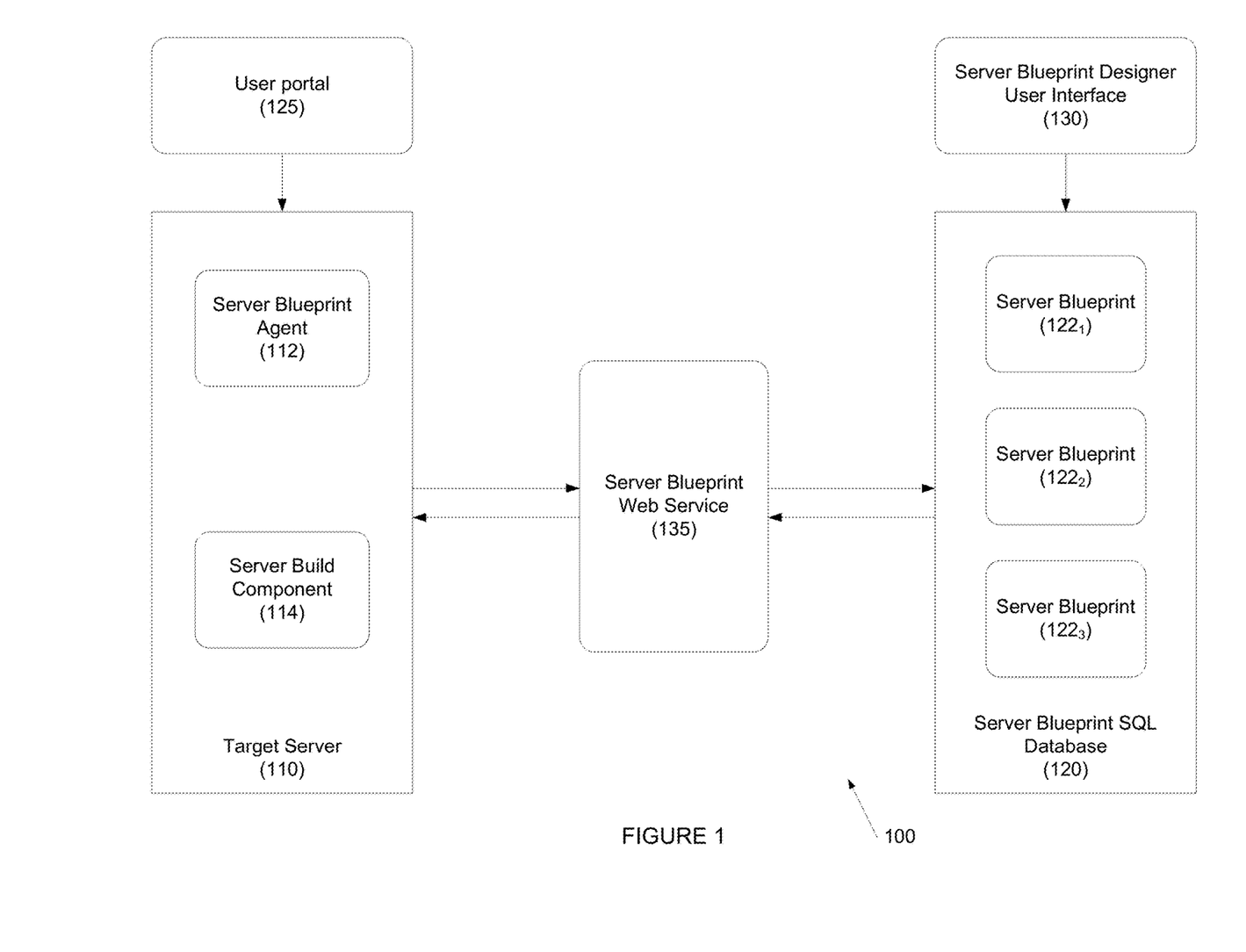
FIG. 1 depicts a system for customization server operating system provisioning using server blueprints is disclosed according to one embodiment.

Referring to FIG. 1, a system for customization server operating system provisioning using server blueprints is disclosed according to one embodiment. System 100 may include target server 110 which may execute server blueprint agent 112 and server build component 114, server blueprint SQL database 120, user portal 125, server blueprint designer user interface 130, and server blueprint web service 135. In one embodiment, server blueprint SQL database 120 may include a plurality of server blueprints 122. Web Service Agent 120 may be a client.

In one embodiment, target server 110 may be any computing device which is to be provisioned. In one embodiment, target server 110 may include one or more computer processors (not shown), memory (not shown), etc. Server blueprint agent 112 and server build component 114 may be computer programs, applications, scripts, etc. that may be executed by the one or more computer processors. In another embodiment, server blueprint agent 112 and/or server build component 114 may be provided on an external tangible device, such as a DVD, flash memory, etc.

In one embodiment, server blueprint designer user interface 130 may be used to create and manage server blueprints 122.

In one embodiment, target server 110 may interface with other network resources (e.g., databases, cloud, etc.) which may provide the operating system, programs, etc. as is necessary and/or desired.

Figure 2:
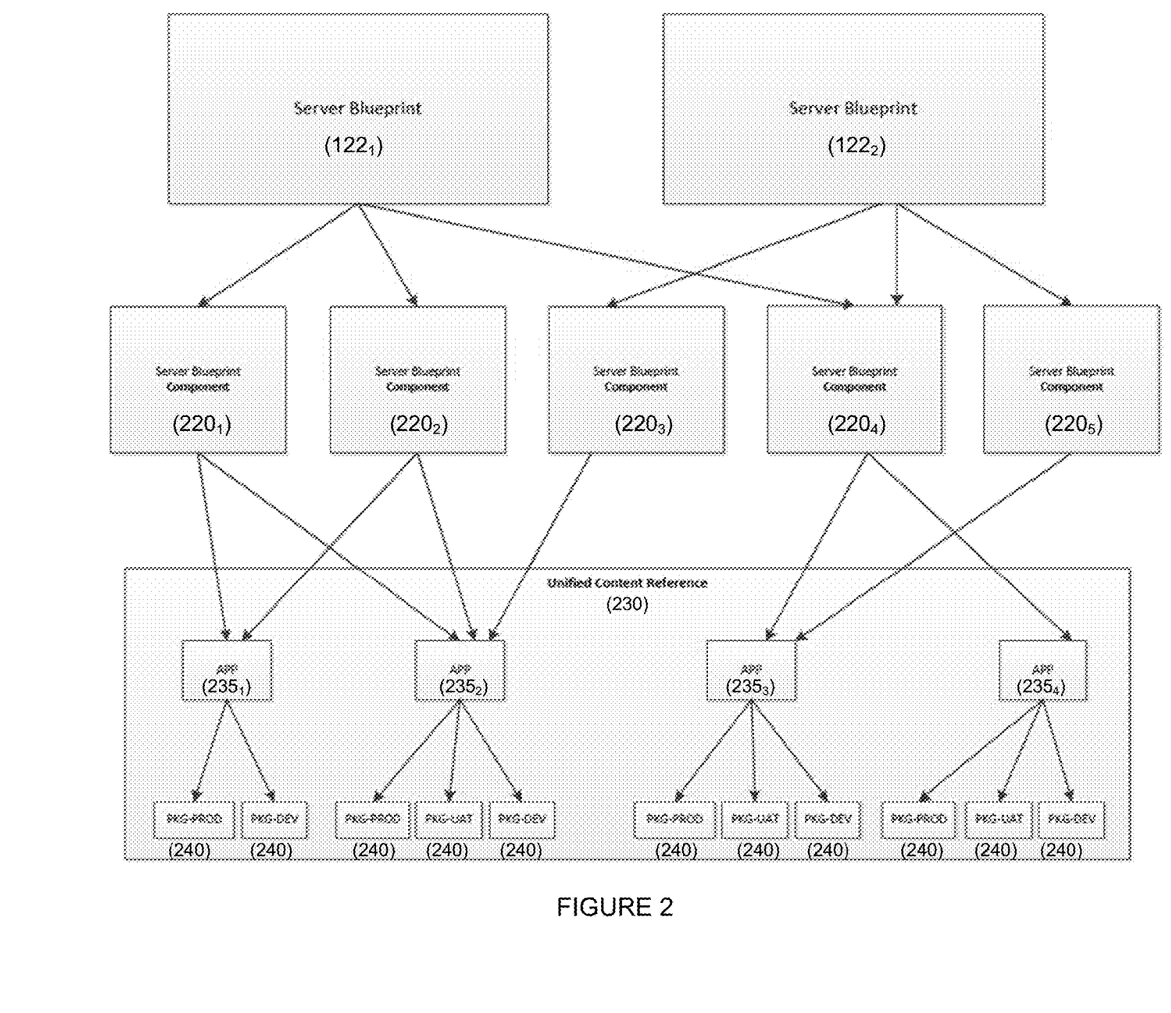
FIG. 2 depicts a server blueprint structure according to one embodiment.

Referring to FIG. 2, a server blueprint structure is disclosed according to one embodiment. Server blueprints 122 may comprise one or more server blueprint component 220 and one or more application 235 from unified content reference 230. In one embodiment, applications 235 may be packaged by content distribution systems (e.g. Microsoft System Center Configuration Manager) as packages 240. Each package 240 may be identified by a unique ID (identifier). In one embodiment, packages 240 may also reside on a Content Distribution Service.

These content distribution systems typically exist in several environments in an enterprise (e.g., "Development", "QA (Quality Assurance)", "UAT (User Acceptance Testing)", "Production") where packages 240 are developed, tested and deployed.

Each such environment refers to the same software package by unique ID that is unique to each such environment.

In one embodiment, server blueprint 122 may use abstraction layer 230, which may be referred to as the "Unified Content Reference," that addresses the problem of maintaining these multiple unique IDs. For example, each instance of an application 235 in each of the environments may have a record in Unified Content Reference 230 that may be linked together by a common key. An example of this common key is a Globally Unique Identifier, or "GUID," that may be called a "Unified Content ID" or "UCId". The UCID may be used to refer to a specific software instead of an environment's unique ID. This may further simplify the maintenance of server blueprints 122, as the server blueprints 122 may work in any environment.

In one embodiment, applications 235 that are specific to the installation of a specific server component (e.g., a Web Server, a SQL server, etc.) may be grouped together in server blueprint component 220. Any application 235 may be a member of one or more Server Blueprint Components 220. Applications 235 inside a Server Blueprint Component 220 may be arranged in a specific order, as some applications may be dependent on others that must be installed first. If a computer restart is required for a successful installation of an application, this may be specified as an application property.

Table I, below, provides an example of application properties for an application:

TABLE I

| Name | Description | Sample Value |
|---|---|---|
| ID | Application ID | 1 |
| ComponentID | Component ID where it is used | 2 |
| ComponentVersion | Component Version | 1.5.1 |
| OS | Operating System | W2012R25 |
| ContentType | Content Type | Package |
| UCId | Universal Content ID | 28BDAF9C-08DF-4883-BC1A-C5334B81E2C6 |
| Name | Application Name | Notepad |
| NetworkZoneId | Network Zone Id | 1 |
| RegionId | Region Id | 2 |
| LOBId | Line Of Business Id | 1 |
| PlatformId | PlatformId | 3 |
| DomainId | Content Type | 3 |
| MaufacturerId | Universal Content ID | 6 |
| EnvironmentId | Environment Id | 5 |
| RestartRequired | Restart Flag | 0 |

In one embodiment, Server Blueprint Components may support versioning.

In one embodiment, each server blueprint component 220 may include two components—a base component and a web server blueprint component. The base component may include or identify, for example, a base operating system and a common set of applications installed on all server systems (e.g., Antivirus, Backup software, etc.). The web server blueprint component may include, for example, Internet Information Services ("IIS") installation and configuration.

Server Blueprint Components 220 may support, for example, versioning, cloning, and filtering based on operating systems and server roles. Examples of properties for Sever Blueprints are provided in Table II, below.

TABLE II

| Name | Description | Sample Value |
|---|---|---|
| ID | BlueprintID | 1 |
| BlueprintName | Blueprint Name | IIS Server |
| MajorVersion | Major Version | 1 |
| MinorVersion | Minor Version | 5 |
| BuildVersion | Build Version | 1 |
| BlueprintDescription | Blueprint Description | My IIS Server Blueprint |
| ServerRoleId | Server Role Id | 1 |
| OSId | Operating System Id | 2 |

Figure 3:
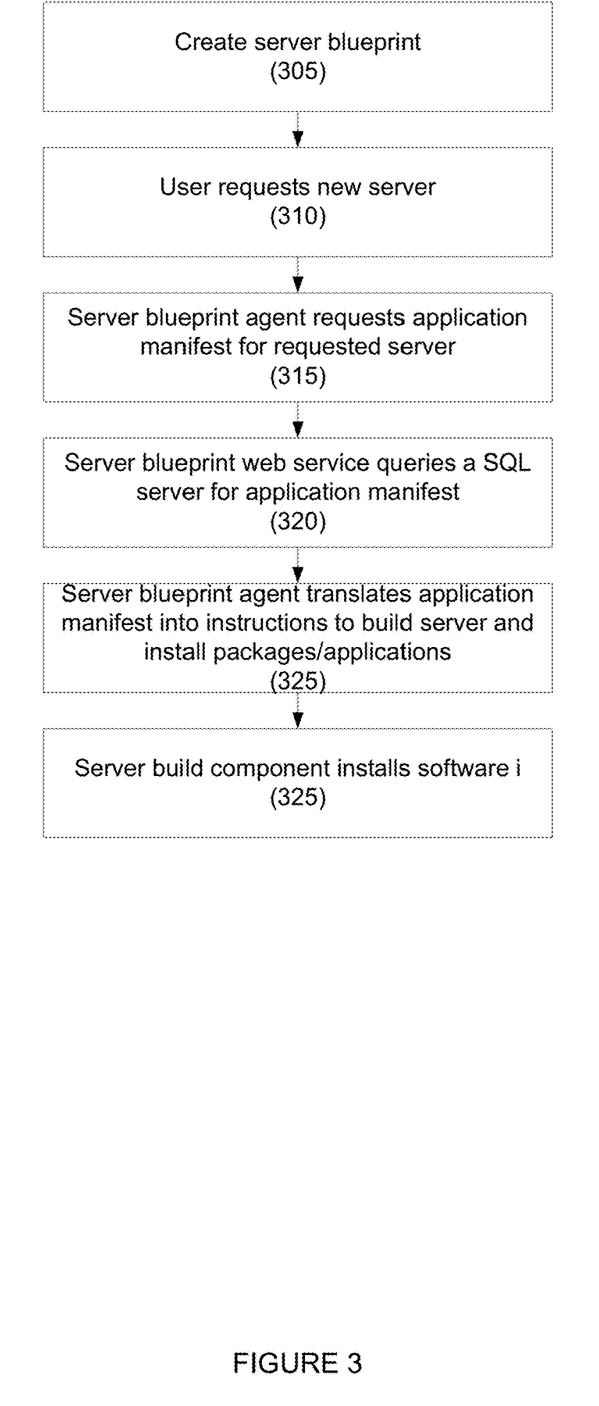
FIG. 3 depicts a method for customization of server operating system provisioning using server blueprints according to one embodiment.

Referring to FIG. 3, a method for customization of server operating system provisioning using server blueprints according to one embodiment is disclosed.

In step 305, a user (e.g., an IT Administrator) may create one or more server blueprint using, for example, a server blueprint designer. The server blueprint may be published or made available on, for example, a self-service portal.

In one embodiment, the server blueprint may be generated using, for example, machine learning. In one embodiment, each server blueprint component may include a configuration file that specifies the server blueprint component's dependencies and requirements (e.g., required libraries, restart required, etc.). The server blueprint may be automatically generated based on those dependencies.

In step 310, a user may initiate a request for a new server using, for example, a self-service portal. In one embodiment, the self-service portal may identify available Server Blueprints, or it may allow the user to specify features of the Server Blueprint (e.g., operating system, components, etc.).

In another embodiment, the user may identify the role for the server, and the appropriate Server Blueprint may be identified for the user.

In one embodiment, the user may submit a Server Blueprint Request that may include some or all of the following request parameters: (1) Operating System; (2) Server Role; (3) Server Blueprint Name and Version; (4) Platform; (5) Environment; and (6) Domain. The request may include any other information as is necessary and/or desired. Table III, below, provides additional examples of request parameters that may be included in the Request.

TABLE III

| Name | Description | Sample Value |
| --- | --- | --- |
| ID | Application ID | 1 |
| ComponentID | Component ID where it is used | 2 |
| ComponentVersion | Component Version | 1.5.1 |
| OS | Operating System | W2012R25 |
| ContentType | Content Type | Package |
| UCId | Universal Content ID | 28BDAF9C-08DF-4883-BC1A-C5334B81E2C6 |
| Name | Application Name | Notepad |
| NetworkZoneId | Network Zone Id | 1 |
| RegionId | Region Id | 2 |
| LOBId | Line Of Business Id | 1 |
| PlatformId | PlatformId | 3 |
| DomainId | Content Type | 3 |
| MaufacturerId | Universal Content ID | 6 |
| EnvironmentId | Environment Id | 5 |
| RestartRequired | Restart Flag | 0 |

In step 315, target server executing a server blueprint agent may contact the server blueprint web service and may request an application manifest. In one embodiment, the request may include the request parameters received in step 310.

In step 320, the server blueprint web service may query a SQL server that hosts a server blueprints database for the application manifest. The server blueprint web service may format the results as a XML (Extensible Markup Language) manifest and may return the results to the server blueprint agent.

In step 325, in one embodiment, the server blueprint agent may perform actions necessary to translate the XML manifest into instructions to the build the server and install specific packages and applications in a specific order and restart computer when specified in the application manifest.

In one embodiment, the server blueprint agent may populate a special structure inside OSD task sequence with applications and packages from the application manifest. The structure may include groups of components that may be separated by computer restart actions.

In one embodiment, computer restart actions may be disabled based on a value of a special TSAppRestarts/TSPkgRestarts variable. Each group may be populated with packages or applications from the manifest that may be read sequentially until a computer restart flag is encountered. At that point, the agent may increment the value of TSAppRestarts/TSPkgRestarts variable, which enables the a corresponding computer restart action and may start populating the next group. The process may continue until all packages and applications from the application manifest are processed.

Figure 4:
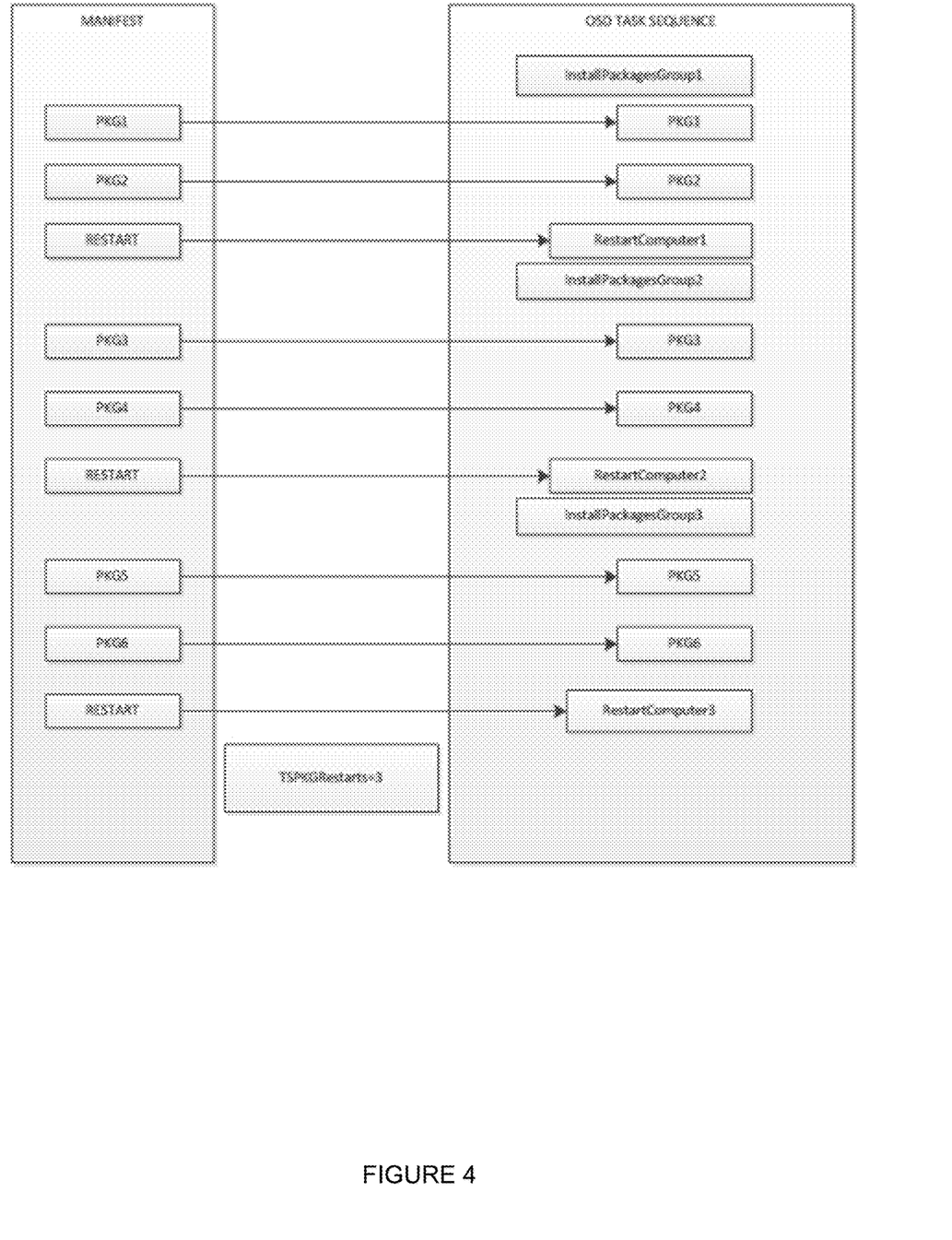
FIG. 4 depicts an exemplary package group install according to one embodiment.

An example of this process is illustrated in FIG. 4.

Next, in step 330, a server build component executed by the target server may processes the dynamic variable list and may install the software.

Although certain components have been identified as performing certain actions, it should be recognized that this is exemplary only and other components may perform these functions as is necessary and/or desired.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array) or PAL (Programmable Array Logic), or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD (Digital Versatile Disc), an integrated circuit, a hard disk, a floppy disk, an optical disk, a magnetic tape, a RANI (Random Access Memory), a ROM (Read-Only Memory), a PROM (Programmable Read-Only Memory), an EPROM (Erasable Programmable Read-Only Memory), a wire, a cable, a fiber, a communications channel, a satellite transmission, a memory card, a SIM (Subscriber Identity Module) card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for provisioning a server using a server blueprint, comprising:
   in a target server comprising a computer processor:
      generating, by machine learning, a plurality of server blueprints, wherein each server blueprint is based on a configuration file that specifies a set of software dependencies and operational requirements;
   a server blueprint agent executed by the computer processor receiving a request to provision the target server, the request to provision comprising an identification of a server blueprint for a target server role, wherein the request to provision the target server comprises an identification of a domain of the target server and an identification of a value corresponding to the target server role, and wherein the server blueprint includes an operating system, a common set of applications, and configuration information based on the target server role;
   the server blueprint agent requesting, over a computer network, an application manifest for the server blueprint comprising a dynamic identification of applications to install on the target server based on the value corresponding to the target server role;
   the server blueprint agent translating the application manifest into software build and install instructions, the install instructions comprising a computer restart action; and
   a server build component executing the build and install instructions on the target server;
   wherein the target server comprises a single computing device.

2. The method of claim 1, wherein the software build component retrieves, from a network location, applications to install in response to the install instructions.

3. The method of claim 1, wherein the request to provision further comprises a server operating system for the target server.

4. The method of claim 1, wherein the server blueprint agent web service retrieves the application manifest from a SQL server.

5. The method of claim 1, wherein the plurality of build and install instructions comprise an operating system deployment task sequence.

6. The method of claim 1, wherein the server blueprint comprises:
   a plurality of server blueprint components, each server blueprint component comprising a plurality of applications.

7. The method of claim 6, wherein the plurality of applications is arranged in the server blueprint component in an installation order.

8. The method of claim 6, wherein each application comprises a plurality of packages, and each package is associated with a unique identifier.

9. A system for provisioning a server using a server blueprint, comprising:
   a target server comprising a computer processor;
   a server blueprint agent executed by the target server;
   a server build component executed by the target server; and
   a server blueprint web service in communication with the server blueprint agent via a computer network;
   wherein:
      the target server generates, by machine learning, a plurality of server blueprints, wherein each server blueprint is based on a configuration file that specifies a set of software dependencies and operational requirements;
      the server blueprint agent receives a request to provision the target server, the request comprising an identification of a server blueprint for a target server role and an identification of a domain of the target server and an identification of a value corresponding to the target server role, and wherein the server blueprint includes an operating system, a common set of applications, and configuration information based on the target server role;

the server blueprint agent requests an application manifest for the server blueprint from the server blueprint web service comprising a dynamic identification of applications to install on the target server based on the value corresponding to the target server role;

the server blueprint agent receives the application manifest and translates the application manifest into a plurality of build and install instructions, the install instructions comprising a computer restart action; and the server build component executes the build and install instructions on the target server;

wherein the target server comprises a single computing device.

10. The system of claim 9, wherein the request to provision further comprises a server operating system for the target server.

11. The system of claim 9, wherein the plurality of build and install instructions comprise an operating system deployment task sequence.

12. The system of claim 9, wherein the server blueprint comprises:
a plurality of server blueprint components, each server blueprint component comprising a plurality of applications.

13. The system of claim 12, wherein the plurality of applications is arranged in the server blueprint component in an installation order.

14. The system of claim 12, wherein each application comprises a plurality of packages, and each package is associated with a unique identifier.

15. The system of claim 9, wherein the server build component retrieves, from a network location, applications to install in response to the install instructions.

16. The method of claim 1, wherein each application in the application manifest is associated with a unified content reference identifier.

17. The system of claim 9, wherein each application in the application manifest is associated with a unified content reference identifier.

18. The system of claim 9, wherein the server blueprint web service queries a server blueprint SQL database for the application manifest for the server blueprint.

* * * * *